(12) United States Patent
Alwar et al.

(10) Patent No.: US 7,035,733 B1
(45) Date of Patent: Apr. 25, 2006

(54) METHOD AND SYSTEM FOR OBTAINING ROAD GRADE DATA

(75) Inventors: Narayanan Alwar, Bloomingdale, IL (US); Mike Milici, Chicago, IL (US); Bishnu Phuyal, DesPlaines, IL (US)

(73) Assignee: Navteq North America, LLC, Chicago, IL (US)

( * ) Notice: Subject to any disclaimer, the term of this patent is extended or adjusted under 35 U.S.C. 154(b) by 272 days.

(21) Appl. No.: 10/667,699

(22) Filed: Sep. 22, 2003

(51) Int. Cl.
G01C 21/26 (2006.01)

(52) U.S. Cl. .................. 701/210; 701/208; 701/209; 701/212; 701/213; 340/995.18; 340/995.24; 340/348; 340/120

(58) Field of Classification Search ........ 701/208–210, 701/93–96, 212–213, 1, 28, 33, 36, 48; 340/995.24, 340/995.18, 436, 901, 988, 990; 348/120
See application file for complete search history.

(56) References Cited

U.S. PATENT DOCUMENTS

| | | | | |
|---|---|---|---|---|
| 3,752,251 | A | 8/1973 | Gaeke | 180/104 |
| 5,574,649 | A | 11/1996 | Levy | 364/449 |
| 5,646,857 | A | 7/1997 | McBurney et al. | 364/449.7 |
| 6,023,653 | A * | 2/2000 | Ichimura et al. | 701/208 |
| 6,047,234 | A * | 4/2000 | Cherveny et al. | 701/200 |
| 6,353,785 | B1 * | 3/2002 | Shuman et al. | 701/48 |
| 6,366,851 | B1 * | 4/2002 | Chojnacki et al. | 701/208 |
| 6,484,086 | B1 | 11/2002 | Jeon | 701/93 |
| 6,529,827 | B1 | 3/2003 | Beason et al. | 701/213 |
| 6,577,937 | B1 * | 6/2003 | Shuman et al. | 701/48 |
| 6,674,434 | B1 * | 1/2004 | Chojnacki et al. | 345/428 |
| 6,675,081 | B1 * | 1/2004 | Shuman et al. | 701/48 |
| 6,735,542 | B1 | 5/2004 | Burgett et al. | 702/85 |
| 6,847,887 | B1 * | 1/2005 | Casino | 701/208 |
| 2002/0165669 | A1 | 11/2002 | Pinto et al. | 701/213 |
| 2003/0033071 | A1 | 2/2003 | Kawasaki | 701/80 |
| 2003/0065432 | A1 * | 4/2003 | Shuman et al. | 701/48 |
| 2004/0054470 | A1 | 3/2004 | Farine et al. | 701/213 |

OTHER PUBLICATIONS

Wong et al., Surveying the stuart highway with GPS for the 1996 world solar challenge, 1996, Internet, p. 1-11.*

Bae, Hong S.; Ryu, Jihan; Gerdes, J. Christian, "Road Grade and Vehicle Parameter Estimation for Longitudinal Control Using GPS", *2001 IEEE Intelligent Transportation Systems Conference Proceedings*-Oakland (CA). Aug. 25-29, 1991, pp. 168-173.

* cited by examiner

*Primary Examiner*—Thomas G. Black
*Assistant Examiner*—McDieunel Marc
(74) *Attorney, Agent, or Firm*—Jon D. Shutter; Frank J. Kozak; Grace L. O'Brien

(57) ABSTRACT

A method for collecting data for a geographic database is disclosed. Altitude data are collected using a vehicle traveling in a geographic region. A barometer associated with the vehicle supplies the altitude data. Road grade data along the roads traveled by the vehicle is derived by analyzing the altitude data. The geographic database is updated to indicate the road grade.

19 Claims, 7 Drawing Sheets

METHOD AND SYSTEM FOR OBTAINING ROAD GRADE DATA

REFERENCE TO RELATED APPLICATION

The present application is related to the co-pending application entitled "METHOD AND SYSTEM FOR COMPUTING ROAD GRADE DATA" filed on the same date herewith, Application Ser. No. 10/667,769 the entire disclosure of which is incorporated by reference herein.

BACKGROUND OF THE INVENTION

The present invention relates to collecting geographic data for a geographic database and more particularly, the present invention relates to a method and system for collecting road grade data for a geographic database using a barometer.

Geographic databases have various uses. Geographic databases are used in in-vehicle navigation systems, personal computers, networked computing environments, and various other kinds of platforms, as well as on the Internet. Geographic databases are used with various kinds of applications to provide various navigation-related and map-related functions including map display, route calculation, route guidance, truck fleet deployment, traffic control, traffic monitoring, electronic yellow pages, roadside assistance, emergency services, and so on.

In order to provide these kinds of functions, a geographic database includes data that represent geographic features in a region. The geographic features that are represented in a geographic database may include roads, intersections, and so on. A geographic database includes information about the represented geographic features, such as the geographic coordinates of roads in a geographic region, speed limits along the road segments, locations of stop lights, turn restrictions at intersections of roads, address ranges, street names, and so on.

Collecting information for a geographic database is a significant task. Not only is the initial collection of data a significant undertaking, but a geographic database needs to be updated on a regular basis. For example, new streets are constructed, street names change, traffic signals are installed, and turn restrictions are added to existing roads. Also, new levels of detail may be added about geographic features that are already represented in an existing geographic database. For example, an existing geographic database for roads may be enhanced with information about lane widths, shoulder sizes, traffic signs, lane barriers, address ranges, sidewalks, bicycles paths, etc. Thus, there exists a need to continue to collect information for a geographic database.

One type of information that is useful to include in a geographic database is road grade information. One way of measuring road grade is with a vehicle having a mechanical road grade sensor traveling the road. One shortcoming of the mechanical road grade sensors is that they may provide inaccurate road grade measurements when traveling over bumps or a rough road. Additionally, road grade may be derived with altitude at points along the road determined using surveying equipment. However, surveying equipment may require that the equipment be mounted in a stationary position and therefore is not useable in a moving vehicle.

Accordingly, it would be beneficial to collect road grade information more inexpensively, efficiently and accurately.

SUMMARY OF THE INVENTION

To address these and other objectives, the present invention comprises a method and system for obtaining road grade data for a geographic database. With a vehicle that travels along roads in the geographic region, altitude data are collected using a barometer associated with the vehicle. Road grade data along the roads traveled by the vehicle is inferred by analyzing the altitude data. The geographic database is updated to indicate the road grade.

DETAILED DESCRIPTION OF THE PRESENTLY PREFERRED EMBODIMENTS

I. Geographic Database

Figure 1:
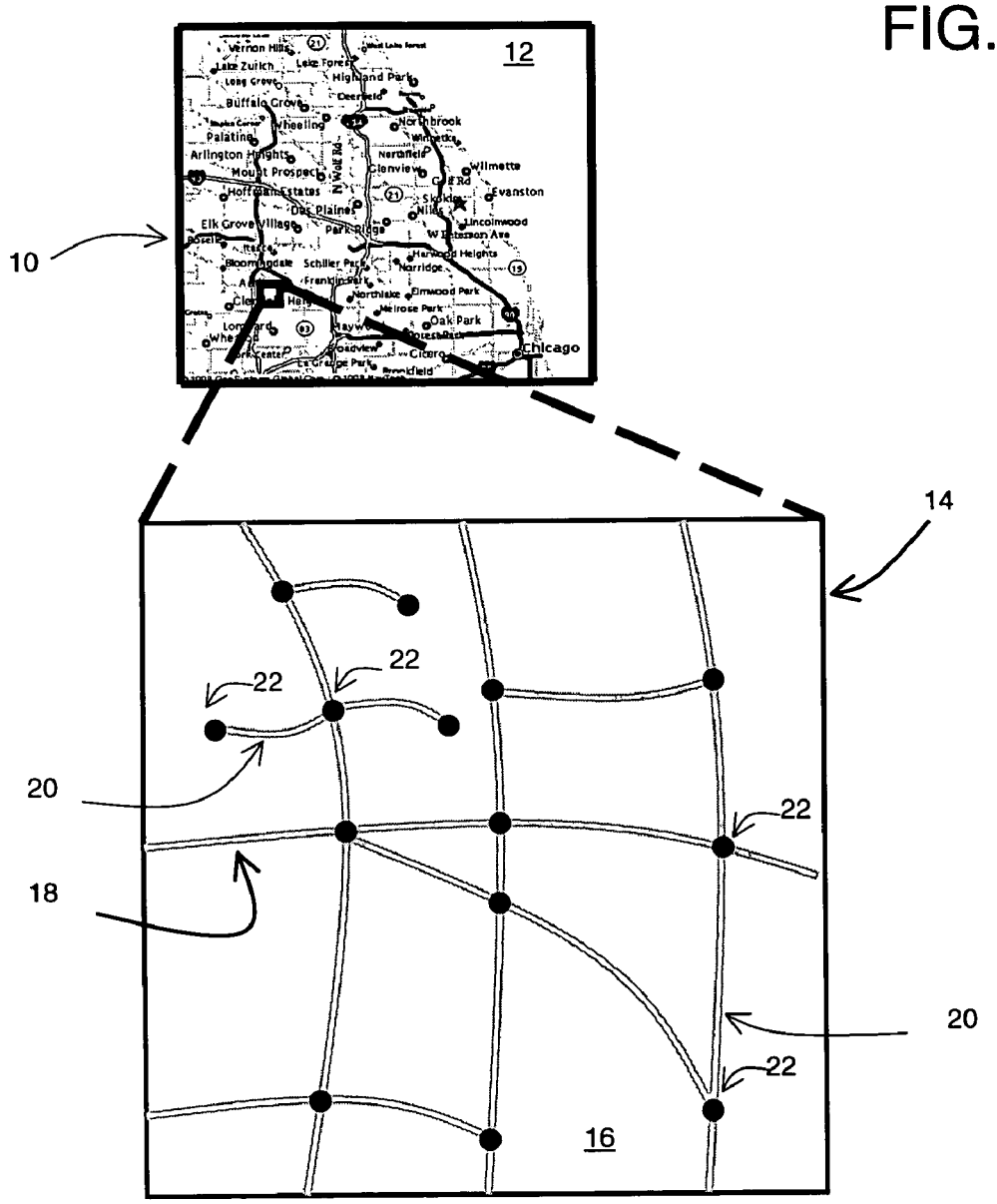
FIG. 1 shows a map of a geographic region.

FIG. 1 shows a map 10 of a geographic region 12. The geographic region 12 may correspond to a metropolitan or rural area, a state, a country, or combinations thereof, or any other area of comparable size. Located in the geographic region 12 are physical geographic features, such as roads, points of interest (including businesses, municipal facilities, etc.), lakes, rivers, railroads, municipalities, etc.

FIG. 1 also includes an enlarged map 14 of a portion 16 of the geographic region 12. The enlarged map 14 illustrates part of the road network 18 in the geographic region 12. The road network 18 includes, among other things, roads and intersections located in the geographic region 12. As shown in the portion 16, each road in the geographic region 12 is composed of one or more road segments 20. A road segment 20 represents a portion of the road. Each road segment 20 is shown to have associated with it two nodes 22; one node represents the point at one end of the road segment and the other node represents the point at the other end of the road segment. The node at either end of a road segment may correspond to a location at which the road meets another road, i.e., an intersection, or where the road dead-ends.

Figure 2:
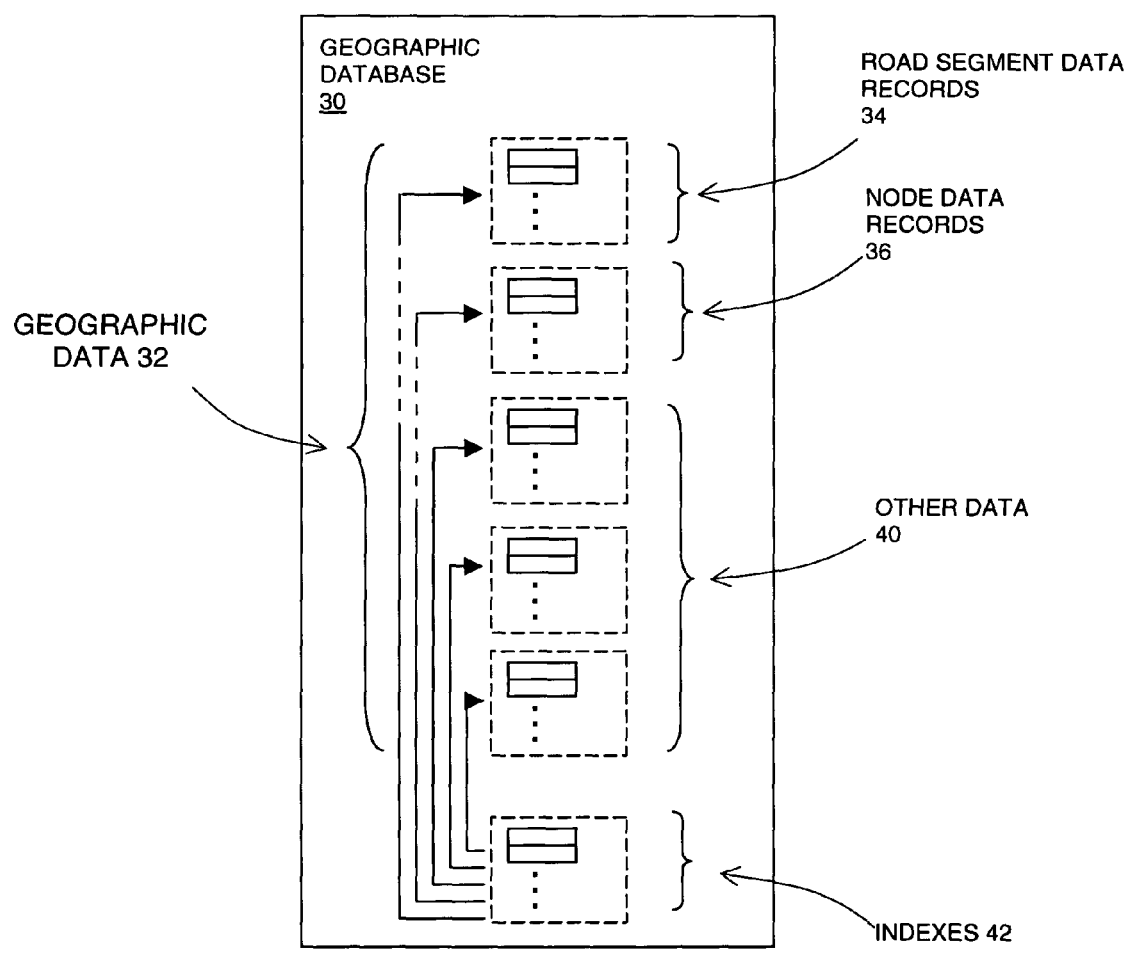
FIG. 2 is a block diagram of a geographic database that represents the geographic region of FIG. 1.

Referring to FIG. 2, a geographic database 30 contains data 32 that represents some of the physical geographic features in the geographic region (12 in FIG. 1). The data 32 contained in the geographic database 30 includes data that represent the road network 18. In the embodiment of FIG. 2, the geographic database 30 that represents the geographic region 12 contains at least one database record 34 (also referred to as "entity" or "entry") for each road segment 20 in the geographic region 12 in FIG. 1. The geographic database 30 that represents the geographic region 12 also includes a database record 36 (or "entity" or "entry") for each node 22 in the geographic region 12. (The terms "nodes" and "segments" represent only one terminology for describing these physical geographic features and other terminology for describing these features is intended to be encompassed within the scope of these concepts.)

The geographic database 30 may also include other kinds of data 40. The other kinds of data 40 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. The geographic database 30 also includes indexes 42. The indexes 42 may include various types of indexes that relate the different types of data to each other or that relate to other aspects of the data contained in the geographic database 30.

Figure 3:
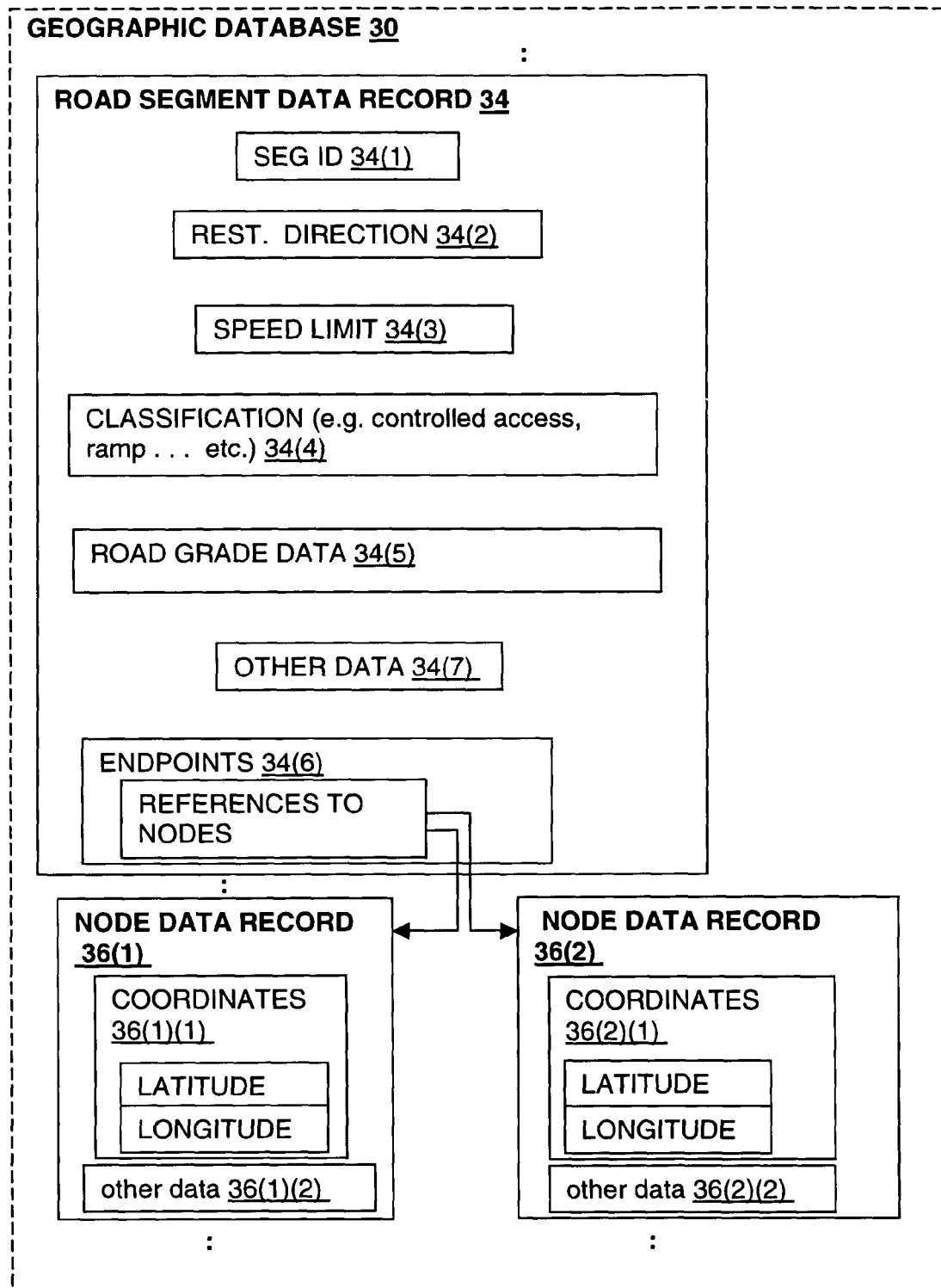
FIG. 3 is a block diagram showing a road segment data record contained in the geographic database of FIG. 2.

FIG. 3 shows some of the components of a road segment data record 34 contained in the geographic database 30. The road segment record 34 includes a segment ID 34(1) by which the data record can be identified in the geographic database 30. Each road segment data record 34 has associated with it information (such as "attributes", "fields", etc.) that describes features of the represented road segment. The road segment data record 34 may include data 34(2) that indicate the restrictions, if any, on the direction of vehicular travel permitted on the represented road segment. The road segment data record 34 includes data 34(3) that indicate a speed limit or speed category (i.e., the maximum permitted vehicular speed of travel) on the represented road segment. The road segment data record 34 may also include data 34(4) indicating whether the represented road segment is part of a controlled access road (such as an expressway), a ramp to a controlled access road, a bridge, a tunnel, a toll road, a ferry, and so on.

The road segment record 34 may also include road grade data 34(5) that indicate the grade of the road segment. In one embodiment, the road grade data 34(5) include road grade change points and a corresponding percentage of grade change. Additionally, the road grade data 34(5) may include the corresponding percentage of grade change for both directions of a bidirectional road segment. The location of the road grade change point is represented as a position along the road segment, such as thirty feet from the end or node of the road segment. For example, the road segment may have an initial road grade associated with its beginning node. The road grade change point indicates the position on the road segment wherein the road grade or slope changes, and percentage of grade change indicates a percentage increase or decrease of the grade or slope. Each road segment may have several grade change points depending on the geometry of the road segment. In another embodiment, the road grade data 34(5) includes the road grade change points and an actual road grade value for the portion of the road segment after the road grade change point until the next road grade change point or end node. In a further embodiment, the road grade data 34(5) includes elevation data at the road grade change points and nodes.

The road segment data record 34 also includes data 34(6) providing the geographic coordinates (e.g., the latitude and longitude) of the endpoints of the represented road segment. In one embodiment, the data 34(6) are references to the node data records 36 that represent the nodes corresponding to the endpoints of the represented road segment. The road segment data record 34 may also include or be associated with other data 34(7) that refer to various other attributes of the represented road segment. The various attributes associated with a road segment may be included in a single road segment record, or may be included in more than one type of record which are cross-referenced to each other. For example, the road segment data record 34 may include data identifying what turn restrictions exist at each of the nodes which correspond to intersections at the ends of the road portion represented by the road segment, the name or names by which the represented road segment is known, the street address ranges along the represented road segment, and so on.

Each of the node data records 36 may have associated information (such as "attributes", "fields", etc.) that allows identification of the road segment(s) that connect to it and/or its geographic position (e.g., its latitude and longitude coordinates). For the embodiment shown in FIG. 3, the node data records 36(1) and 36(2) include the latitude and longitude coordinates 36(1)(1) and 36(2)(1) for their node. The node data records 36(1) and 36(2) also include other data 36(1)(2) and 36(2)(2) for their node.

The data records 34 in the geographic database 30 that represent roads may not necessarily include all the same types of data attributes. One reason for this is that roads do not all have the same properties. For example, some roads have a highway designation (e.g., "Wisconsin State Highway 120") whereas other roads do not. Another reason why data records in the geographic database 30 that represent roads may not have the same data attributes is that some of the properties of a road may not have been collected or confirmed.

Road grade data may be collected using the data collection system as described below. In one embodiment, road grade data are obtained for all the roads represented in the geographic database. In another embodiment, road grade data are included for only some of the roads represented in the geographic database. According to this latter embodiment, some of the roads are represented by data records that do not include road grade data.

II. System for Obtaining Road Grade Data

A. Data Collection System

Figure 4:
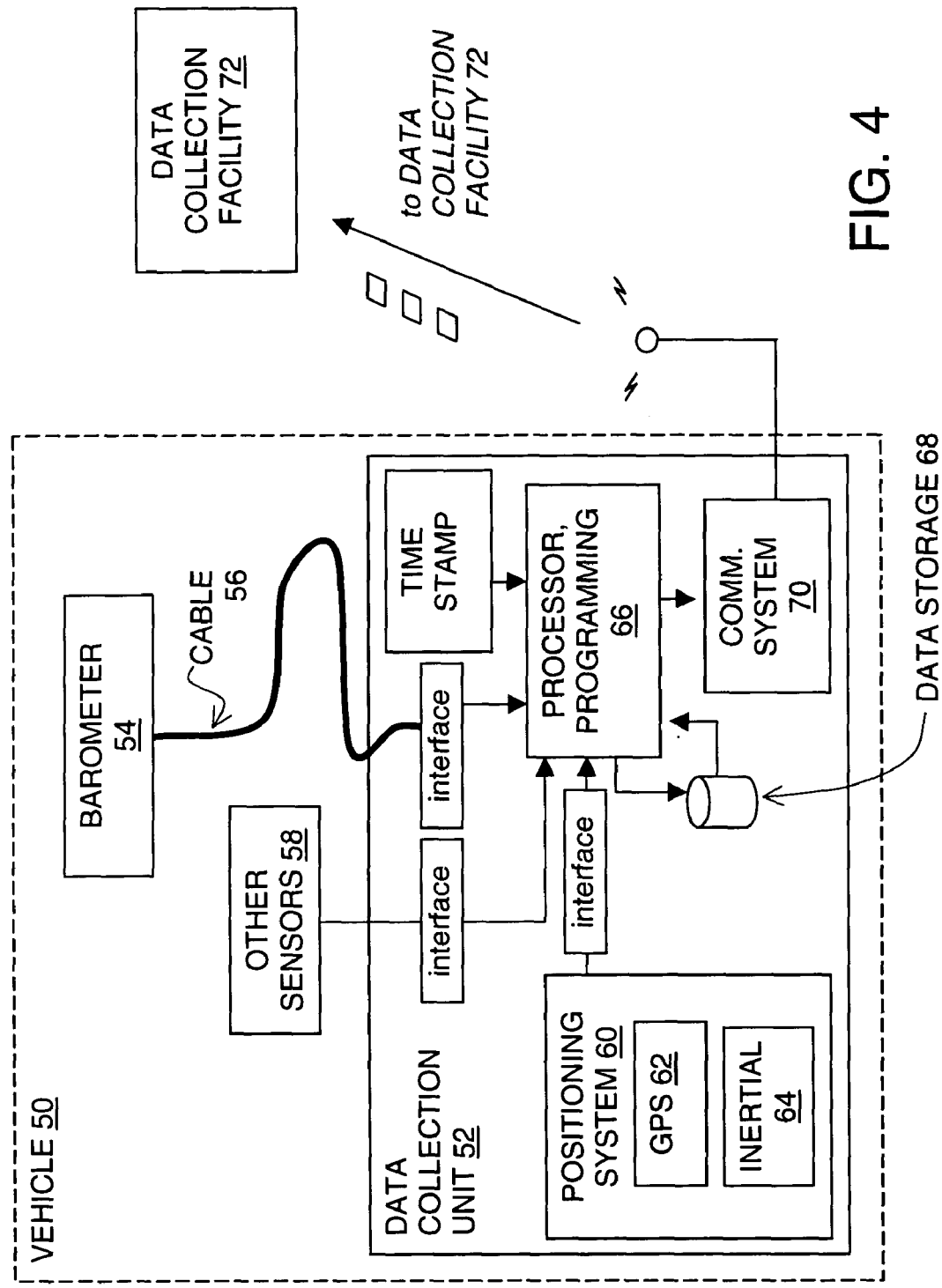
FIG. 4 is a block diagram illustrating a vehicle equipped for data collection.

FIG. 4 shows a vehicle 50 equipped with a data collection unit 52. The vehicle 50 may be a data collection vehicle operated by a geographic database developer. The data collection vehicle is operated specifically for data collection purposes. The geographic database developer determines the routes traveled by the vehicle in order to collect specific data. Alternatively, the vehicle 50 is operated as a probe vehicle. A probe vehicle is a vehicle that collects road-related data while it is being used for purposes unrelated to the collection of road-related data. For example, a probe vehicle is operated for ordinary, everyday purposes, such as commuting, leisure or business. A member of the public may operate the probe vehicle, or alternatively, a commercial enterprise or government entity may operate the probe vehicle. While the probe vehicle is being used for a purpose unrelated to the collection of road-related data, the data collection unit 52 in the vehicle 50 operates to collect road-related data.

Referring to FIG. 4, the vehicle 50 includes a barometer 54 that provides an altitude measurement. In one embodiment, the barometer 54 is a Druck DPI 740 barometer or an appropriate barometer from another manufacturer. The Druck DPI 740 provides the altitude measurement in meters or feet above sea level and has a resolution of approximately 25 centimeters. In another embodiment, the barometer 54 provides an atmospheric pressure measurement that is converted into an altitude value with a multiplication conversion.

Due to bias in the barometer and atmospheric conditions, the altitude measurement provided by the barometer may not provide the true altitude of the location. For example, if the true altitude at a particular location is 120 meters above sea level, the barometer may provide an altitude measurement of 110 meters. However, at a location 50 meters away from the prior location, if the true altitude is 110 meters, the barometer will provide an altitude measurement of 100 meters. Thus, the barometer does not always provide true absolute altitude, but the barometer does provide an approximate true relative altitude. Since road grade is derived from relative altitude, the barometer can be used to collect altitude data for deriving road grade.

The barometer 54 is connected to the data collection unit 52 via a cable 56 or other suitable means. (Although not shown in FIG. 4, the data collection unit 52 may include other connections to the vehicle. For example, the data collection unit 52 may receive power from the vehicle battery via a power cable.) The data collection unit 52 is also connected to other sensors 58, such as a speed sensor indicating the current speed of the vehicle 50, an odometer indicating distance traveled, a sensor that indicates heading or bearing of the vehicle or any other sensor.

The data collection unit 52 is a combination of hardware and software components. The data collection unit 52 includes a positioning system 60. The positioning system 60 includes a GPS 62. The positioning system 60 may also include inertial sensors 64. The positioning system 60 enables the position (e.g., coordinate pair of latitude and longitude, or alternatively a coordinate triple of latitude, longitude and altitude) of the data collection unit 52 (and thus the vehicle 50 in which it is located) to be determined. In one embodiment, the GPS 62 has an accuracy of approximately 3 meters for latitude and longitude; however, the GPS 62 may have any other accuracy, such as accuracy ranging from 2 centimeters to 20 meters for latitude and longitude. The uncertainty in GPS generated altitude is significantly worse than for latitude and longitude.

The data collection unit 52 also includes the necessary hardware and software (processor and programming 66) to receive data from the positioning system 60, the barometer 54, and the other sensors 58. The data collection unit 52 includes the appropriate interfaces to allow the processor and programming 66 to receive data from the positioning system 60, the barometer 54 and the other sensors 58. The processor and programming 66 in the data collection unit 52 are suitable for selecting or receiving the altitude measurement from the barometer 54 at appropriate time periods, such as every second. Additionally, the processor and programming 66 select or receive the data from the positioning system 60 at corresponding times. Furthermore, the processor and programming 66 select or receive data from the other sensors 58 at corresponding times. The processor and programming 66 relate the data received from the positioning system 60, the barometer 54 and the other sensors 58 to each other. In one embodiment, the data from the barometer 54, data from the positioning system and other data are synchronized. Furthermore, the processor and programming 66 may associate the data received from the positioning system 60, the barometer 54 and the other sensors 58 with a time stamp or any other information.

The data collection unit 52 includes a data storage device 68. The processor and programming 66 in the data collection unit 52 provide for storing some or all the data from the positioning system 60, the barometer 54 and the other sensors 58 on the data storage device 68. The data storage device 68 is a non-volatile data storage unit, such as a hard drive or a memory card.

In one embodiment, the data collection unit 52 may receive data from a vehicle navigation system or may be part of the navigation system. There are various kinds of navigation systems installed in vehicles. Some navigation systems use vehicle data in connection with providing certain navigation-related functions. As an example, some vehicle navigation systems use the vehicle speed or wheel speed in conjunction with other devices, such as a gyroscope or GPS, to help determine the position of the vehicle. Additionally, the vehicle navigation system may use the position of the vehicle to identify a road segment on which the vehicle is traveling. The data collection unit 52 may receive position, speed and other data from the navigation system. Alternatively, the navigation system may perform the functions of the data collection unit 52 and may include an additional processor and programming to collect data. The data collection unit 52 may include a communications system 70. The communications system 70 provides for sending some or all the data from the positioning system 60, the barometer 54, the other sensors 58 and any other data to a remotely located data collection facility 72. In the embodiment of FIG. 4, the communications system 70 provides for wireless transmission of the data from the data collection unit 52 to the remotely located data collection facility 72. In the embodiment of FIG. 4, the data sent from the data collection unit 52 are stored temporarily on the data storage device 68 before being transmitted to the data collection facility 72. Various processes may be performed on the data before they are sent to the remotely located data collection facility 72. For example, the data may be compressed, filtered, normalized, etc. These processes may be performed to reduce the amount of data that need to be sent from the data collection unit 52 to the data collection facility 72.

In one alternative, the data collected by the data collection unit 52 are sent every several seconds or minutes to the data collection facility 72 after being temporarily stored on the data storage device 68 in the data collection unit 52. In another alternative embodiment, the data collected by the data collection unit 52 are sent directly to the data collection facility 72 without being temporarily stored on a data storage device in the data collection unit 52. In another alternative embodiment, the data collected by the data collection unit 52 are stored in the vehicle for a relatively long period of time, e.g., several days or weeks. The data are then sent to the data collection facility 72. The data may be sent wirelessly via a communications system or alternatively, the data may be sent by other means. For example, the data may be transmitted over land-based telephone lines or the Internet. In another embodiment, the data storage medium upon which the data are stored is physically sent to the data collection facility 72 (e.g., by mail). At the data collection facility 72, further processing of the data takes place.

B. Data Collection Facility

Figure 5:
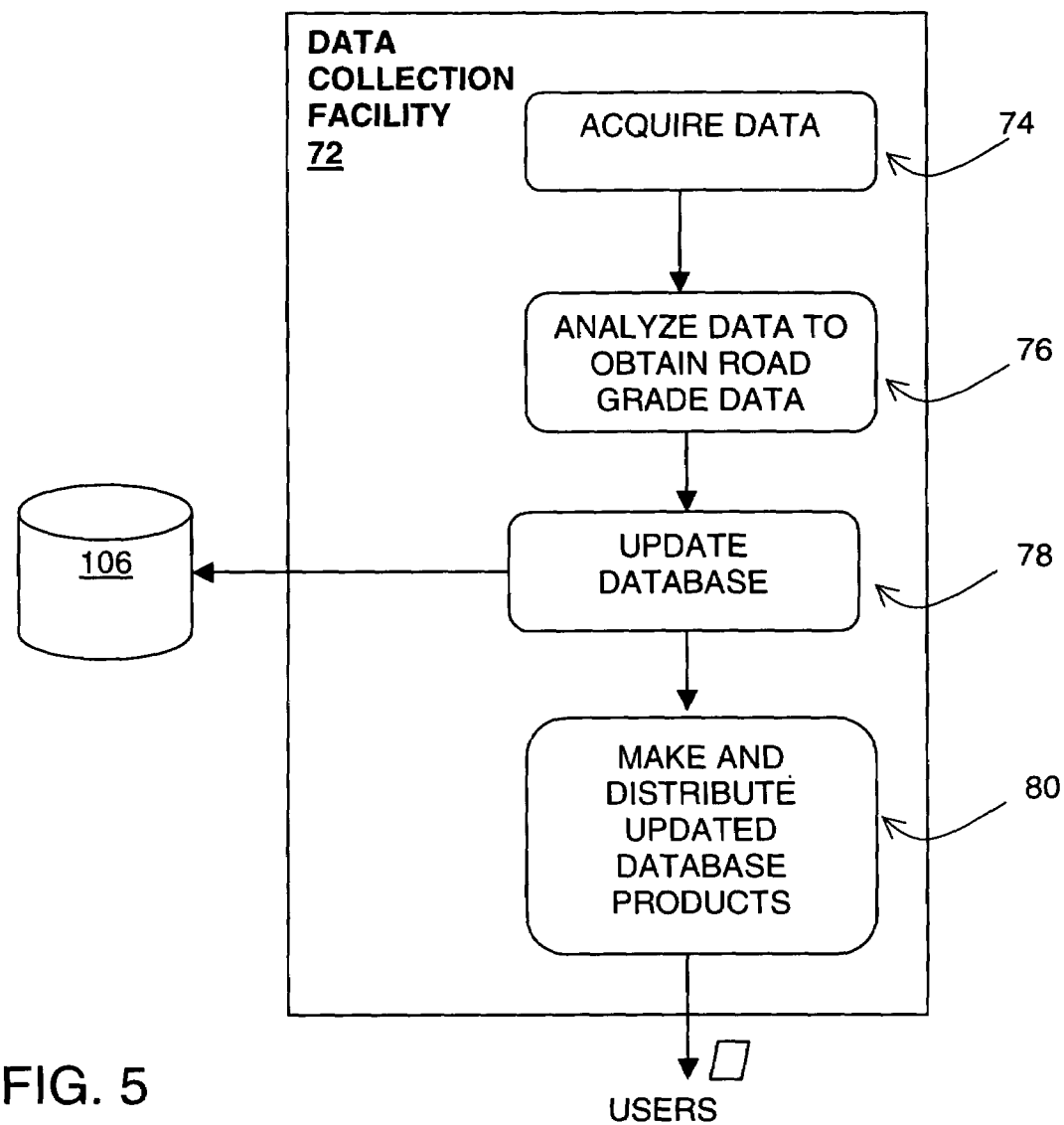
FIG. 5 is a flow chart of the operations of a data collection facility.

According to one embodiment, the data collection facility 72 obtains road grade information and updates the geographic database following the steps shown in FIG. 5. The data collection facility 72 includes necessary hardware and software (processor and programming) to carry out the steps of FIG. 5. The data collection facility 72 receives the data from the vehicle 50 at step 74. The data collection facility 72 obtains the data from the data collection vehicle 50 that is operated by the geographic database developer. Alternatively, the data collection facility 72 may obtain the data from numerous probe vehicles 50. The data collection facility 72 may obtain the data from the vehicle(s) 50 by wireless data transmission or by other means (e.g., sending a diskette or via modem).

Figure 6:
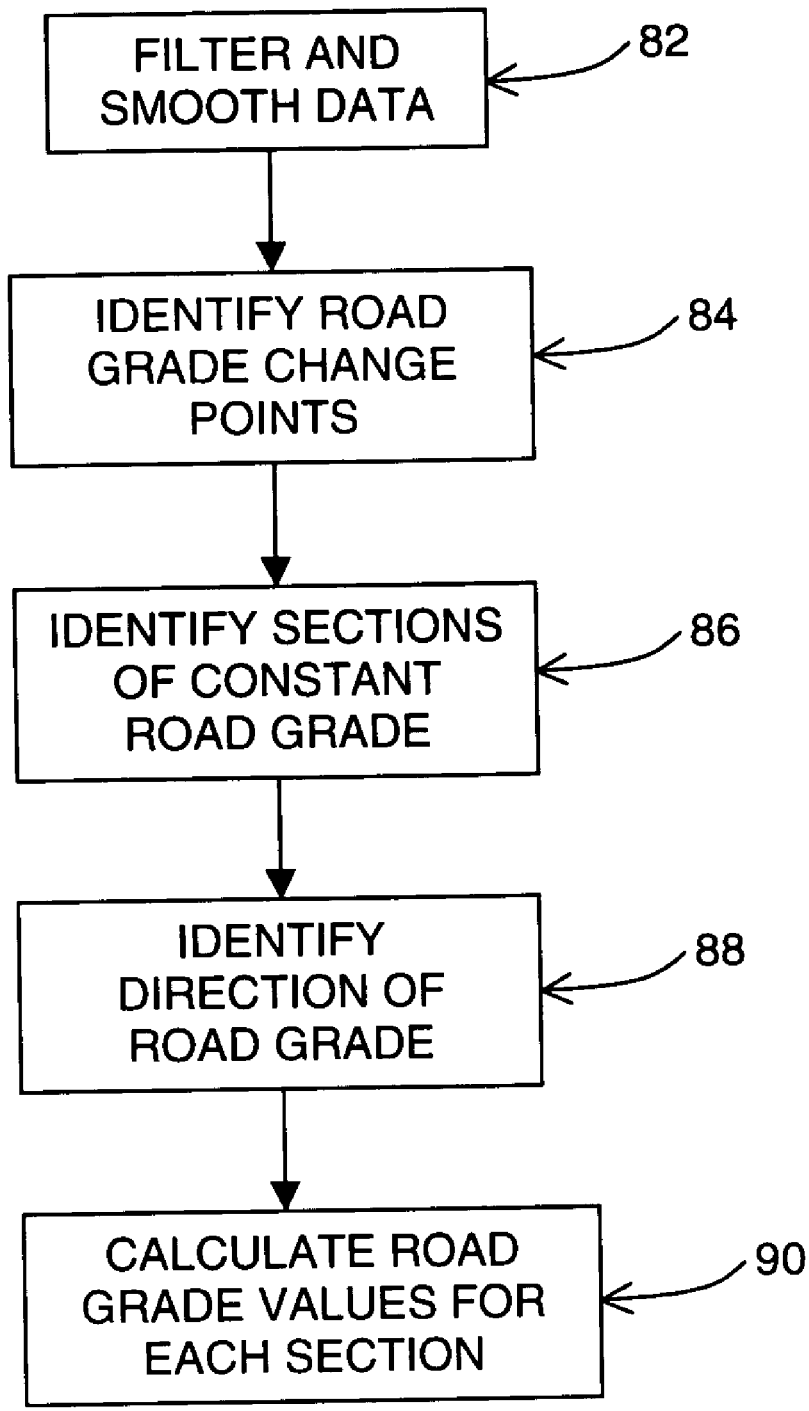
FIG. 6 is a flow chart of the operations of the data collection facility for analyzing data to obtain road grade data.

The data collection facility 72 processes the data received from the vehicle 50 to obtain road grade data at step 76. FIG. 6 illustrates the general steps performed by the data collection facility 72 to analyze the barometer data and position data to obtain road grade data. Detailed methods for computing road grade data are described in co-pending application entitled "METHOD AND SYSTEM FOR COMPUTING ROAD GRADE DATA" filed on the same date herewith, Ser. No. 10/667,769, the entire disclosure of which is incorporated by reference herein.

Referring to FIG. 6, step 82, the data collection facility 72 filters the altitude data to remove outlier data and to obtain a smooth altitude profile along the road segment. The data collection facility 72 filters and smoothes the data using any appropriate method or algorithm. Additionally, data from different vehicles collected on different days may be used to obtain the smooth altitude profile.

Atmospheric conditions and pressure changes measured with the barometer are based in part on weather conditions. Thus, altitude values provided by the barometer 54 may differ under different operating conditions of the vehicle that cause pressure changes. For example, experiments have shown that the altitude values from the barometer 54 when windows of the vehicle 50 are closed differ by a constant amount of approximately 3 meters from the altitude values from the barometer 54 when the windows are open. Additionally, experiments have shown that the altitude values from the barometer 54 when the air conditioning vehicle 50 is operating differ by a constant amount of approximately 3 meters from the altitude values from the barometer 54 when the air conditioning is not operating. These differing altitude values do not adversely affect the road grade determinations because road grade is a measurement of change in altitude per change in horizontal distance, so the constant amount incorporated in the altitude values due to operating conditions drops out as a constant bias. Additionally, the altitude data for each road segment is typically collected under identical operating conditions. For example, typically the air conditioning will be on or off, the window will be open or closed and the weather conditions will be identical along the entire length of each road segment. Although changes between differing conditions of windows open/closed and air conditioning on/off may occur along a road segment, these changes are readily identified as the sudden increase or decrease greater than a threshold amount between consecutive altitude values, such as approximately 3 meters. Once the change is identified, the altitude data is normalized and smoothed to remove or incorporate the constant amount along the entire length of the road segment.

Figure 7:
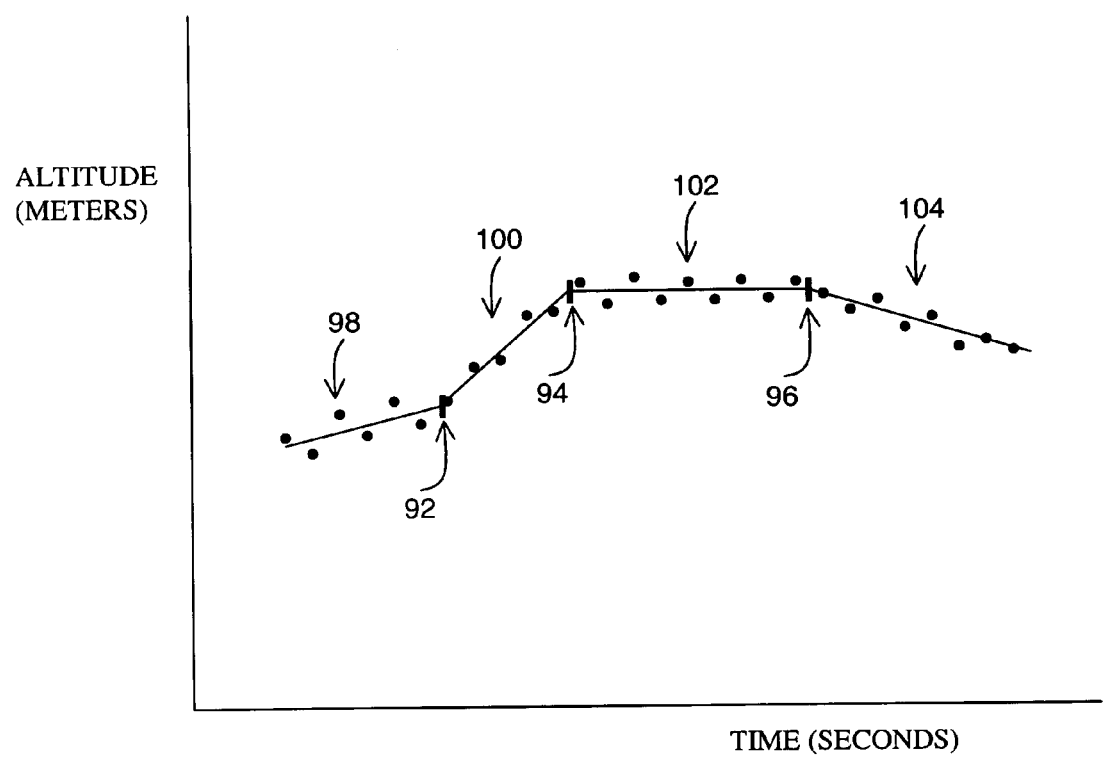
FIG. 7 is a graph of altitude data with inferred road grade data.

FIG. 7 illustrates a smooth altitude profile of data over time as collected by the vehicle 50 traveling along a road segment. FIG. 7 will be used to illustrate some of the steps performed by the data collection facility 72 shown in FIG. 6.

After the altitude data has been filtered and smoothed, the data collection facility 72 identifies road grade change points indicating locations at which the road grade changes at step 84. For example in FIG. 7, road grade change points 92, 94 and 96 are located at positions where the road grade value changes. In one embodiment, the data collection facility 72 computes road grade values between each of the collected data points and identifies a road grade change point as the data point between adjacent road grade values whose difference exceeds a predetermined amount.

At step 86 of FIG. 6, the central data facility 72 identifies sections of constant road grade between adjacent road grade change points. The graph of FIG. 7 illustrates four sections of constant road grade 98, 100, 102 and 104. A section of constant road grade 98 exists between the start of the road segment and road grade change point 92, another section of constant road grade 100 exists between the road grade change point 92 and road grade change point 94, another section of constant road grade 102 exists between the road grade change point 94 and road grade change point 96, and another section of constant road grade 104 exists between the road grade change point 96 and the end of the road segment. In an alternative embodiment, the data collection facility 72 uses curve-fitting algorithms to identify the sections of constant road grade. With the alternative embodiment, after identifying the sections of constant road grade, the data collection facility 72 identifies the grade change points between adjacent sections of constant road grade.

At step 88, the data collection facility 72 identifies the direction of the road grade as incline, flat or decline for each of the sections of constant road grade 98, 100, 102 and 104. In one embodiment, the direction of the road grade is identified by determining the direction of the slope of the line representing the section of constant road grade. For example in FIG. 7, the sections 98 and 100 have positive slopes so their road grades incline, the section 102 has a slope of zero so its road grade is flat, and the section 104 has a negative slope so its road grade declines. In another embodiment, the direction of road grade may be determined by comparing the altitude value associated with road grade change points. For example, the road grade change point 94 has a corresponding altitude value greater than the altitude value of the road grade change point 92, thus section 100 is an incline.

At step 90, the data collection facility 72 calculates a road grade value for each of the sections of constant road grade 98, 100, 102 and 104. The road grade values for each of the sections 98, 100, 102 and 104 are determined by calculating the change in altitude divided by the change in horizontal distance. Road grade may be expressed in percentage, so the previously calculated change in altitude divided by change in horizontal distance is converted into a percentage. The change in altitude may be readily calculated using the altitude data associated with the grade change points as the difference between the altitude associated with one grade change point and the altitude associated with the other grade change point. The change in horizontal distance may also be readily calculated using the latitude/longitude position data. Additionally, once road grade values have been determined for each of the sections of constant road grades between road grade change points, percentage change of grade from one section to an adjacent section may be calculated.

Referring to FIG. 5, after the analysis of step 76, the road grade data are stored in a master copy 106 of the geographic database at step 78. The road grade data may be stored as an attribute to the road segment data record 34. The road grade data that are stored in the master copy 106 of the geographic database may be used to update existing data or to add new data. For example, the master copy 106 of the database may already include road grade data for a particular represented road segment. The new road grade data obtained by using the process described in FIG. 6 can be used to update the existing data, e.g., confirm the existing data or make the existing data more accurate. Alternatively, the master copy 106 of the geographic database may not include road grade data for a particular road segment. If new road grade data are obtained for a road segment that is represented by a data record that does not already include a road grade data attribute, the new road grade data can be added as a new attribute of the data record.

In one embodiment, prior to updating existing data or adding new data to the master copy of the geographic database with the road grade data, the existence and position of some of the identified road grade information may be confirmed by direct observation of field personnel.

The geographic database with new or improved road grade data and other data can be used to make derived database products at step 80. The derived database products may include only portions of all the data in the master version 106 of the database. For example, the derived database products may include data that relate to only one or more specific regions. The derived database products may be used on various kinds of computing platforms. For example, the derived database products may be used in navigation systems (such as in-vehicle navigation systems and handheld portable navigation systems), personal computers (including desktop and notebook computers), and other kinds of devices (such as PalmPilot®-type devices, pagers, telephones, personal digital assistants, and so on). Derived database products may also be used on networked computing platforms and environments, including the Internet. The derived database products may be in a different format than the format in which the master copy of the database is maintained. The derived database products may be in a format that facilitates the uses of the derived products in the platforms in which they are installed. The derived database products may also be stored in a compressed format on the media on which they are located.

C. Alternatives

In an alternative embodiment, the data collection unit 52 of FIG. 4 may perform some of the steps of the data collection facility 72. In this embodiment, rather than sending the altitude and position data to the data collection facility 72, the data collection unit 52 performs the analysis on the data to obtain the road grade information. The data collection unit 52 then stores the road grade data in a storage medium.

In another embodiment, the data collection facility 72 may perform the steps described in related co-pending application entitled "METHOD AND SYSTEM FOR COMPUTING ROAD GRADE DATA" filed on the same date herewith, Ser/ Mp/ 10/667,769, the entire disclosure of which is incorporated by reference herein, to compute road grade data from the collected altitude data and position data.

In another embodiment, the collected altitude and position data may be plotted with the x-axis as latitude, y-axis as longitude and z-axis as altitude to better illustrate the changes in altitude along the roads than the illustration of FIG. 7. Additionally, the altitude data may be plotted versus horizontal distance to better illustrate changes in road grade values.

III. Applications for the Road Grade Data

The road grade data within the geographic database have several applications. First, various driver assistance systems for vehicles that help make travel more efficient and convenient may use the road grade data. For example, one driver assistance system that may use the road grade data is an automatic transmission control system. The automatic transmission control system adjusts the operation of the vehicle transmission to match the grade of the upcoming road. Another driver assistance system that may use the road grade data is an adaptive cruise control system.

It is intended that the foregoing detailed description be regarded as illustrative rather than limiting and that it is understood that the following claims including all equivalents are intended to define the scope of the invention.

We claim:

1. A method of collecting data for a geographic database that represents roads in a geographic region, the method comprising:
   with a vehicle that travels along the roads, using a barometer associated with the vehicle to collect data indicating altitudes as the vehicle travels along the roads;
   analyzing said altitude data;
   based on said analyzing, deriving road grade data along said roads; and
   storing data in said geographic database that represent road grade.

2. The method of claim 1 wherein said road grade data indicates a location of a road grade change point.

3. The method of claim 1 wherein said road grade data indicates a direction of the road grade.

4. The method of claim 1 wherein said road grade data indicates a road grade value.

5. The method of claim 1 further comprising collecting data indicating positions of the vehicle as the vehicle travels along the roads.

6. The method of claim 1 further comprising:
   identifying a change in altitude value between consecutively collected altitude data exceeding a threshold amount.

7. The method of claim 6 wherein said change in altitude corresponds to a change in window position associated with the vehicle.

8. The method of claim 7 wherein said change in altitude corresponds to a change in operation of an air conditioning unit associated with the vehicle.

9. The method of claim 7 wherein said change in altitude corresponds to a change in operation of an air conditioning unit associated with the vehicle.

10. The method of claim 1 further comprising:
    filtering the altitude data to remove outlier data.

11. The method of claim 1 where the vehicle is a probe data collection vehicle that collects data while traveling in the geographic region for purposes other than data collection.

12. A method of obtaining data for a geographic database using a vehicle moving on roads in a geographic region comprising:
    collecting data indicating atmospheric pressure and position of the vehicle as the vehicle travels on roads in the geographic region;
    analyzing the atmospheric pressure data and the position data to identify a section of constant road grade along the road traveled by the vehicle; and
    updating the geographic database to indicate the section of constant road grade.

13. The method of claim 12 wherein the atmospheric pressure data is obtained from a barometer associated with the vehicle.

14. The method of claim 12 further comprising identifying a direction of the road grade.

15. The method of claim 12 further comprising identifying a road grade change point.

16. The method of claim 12 further comprising identifying a road grade value for the section of constant road grade.

17. A system for collecting data for a geographic database that represents roads in a geographic region comprising:
- a data collection unit located in a vehicle that travel along the roads in the geographic region;
- a barometer associated with the vehicle, said barometer providing altitude data to said data collection unit;
- a positioning system associated with the vehicle, said posing system providing position data to said data collection unit; and
- a data processing unit analyzing said altitude data and said position data, based on said analyzing, inferring road grade data along said roads.

18. The system of claim 17 wherein said data processing unit is located in a data collection facility.

19. The system of claim 17 wherein said data collection unit receives data from a navigation system associated with the vehicle.

* * * * *